(12) United States Patent  (10) Patent No.: US 8,245,301 B2
Evans et al.  (45) Date of Patent: *Aug. 14, 2012

(54) NETWORK INTRUSION DETECTION VISUALIZATION

(75) Inventors: Scott Charles Evans, Burnt Hills, NY (US); Thomas Markham, Niskayuna, NY (US); Richard Bejtlich, Manassas Park, VA (US); Jeremy Impson, Vestal, NY (US); Eric Steinbrecher, Windsor, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/560,297

(22) Filed: Sep. 15, 2009

(65) Prior Publication Data

US 2011/0067106 A1 Mar. 17, 2011

(51) Int. Cl.
*G06F 21/00* (2006.01)

(52) U.S. Cl. ............................................ 726/23; 726/22

(58) Field of Classification Search ................ 726/22–25
See application file for complete search history.

(56) References Cited

U.S. PATENT DOCUMENTS

| | | | |
|---|---|---|---|
| 5,903,676 A | 5/1999 | Wu et al. |
| 5,956,676 A | 9/1999 | Shinoda |
| 6,189,005 B1 | 2/2001 | Chakrabarti et al. |
| 6,601,048 B1 | 7/2003 | Gavan et al. |
| 6,782,377 B2 | 8/2004 | Agarwal et al. |
| 6,973,459 B1 | 12/2005 | Yarmus |
| 7,007,035 B2 | 2/2006 | Kamath et al. |
| 7,017,186 B2 | 3/2006 | Day |
| 7,089,592 B2 | 8/2006 | Adjaoute |
| 7,134,141 B2 | 11/2006 | Crosbie et al. |
| 7,254,273 B2 | 8/2007 | Sakanashi et al. |
| 7,260,846 B2 | 8/2007 | Day |
| 7,313,817 B2 | 12/2007 | Evans et al. |
| 7,370,357 B2 | 5/2008 | Sekar |
| 7,409,716 B2 | 8/2008 | Barnett et al. |

(Continued)

FOREIGN PATENT DOCUMENTS

JP 2000112917 4/2000

(Continued)

OTHER PUBLICATIONS

Keogh, E., Wei, L., Xi, X., Lonardi, S., Shieh, S., Sirowy, S., "Intelligent Icons: Integrating Lite-Weight Data Mining and Visualization into GUI Operating Systems," ICDM (2006).*

(Continued)

*Primary Examiner* — Jung Kim
*Assistant Examiner* — Theodore Parsons
(74) *Attorney, Agent, or Firm* — Miles & Stockbridge P.C.

(57) ABSTRACT

A network activity visualization system can include a minimum description length (MDL) based network intrusion detection system having an MDL grammar database adapted to store a plurality of MDL grammars, and a pattern matching module adapted to match a received network activity data set against the MDL grammars by calculating a distance of the network activity data set from each MDL grammar. The system can also include an intelligent icon module coupled to the MDL-based intrusion detection system and adapted to receive the MDL grammars and distances of a network data set from each respective MDL grammar, and adapted to generate intelligent icons based on the MDL grammars and distances. The system can further include a display system adapted to display the intelligent icons so as to provide a visual indication of network security.

23 Claims, 13 Drawing Sheets

Normal Model

Attack Model 1

Attack Model 2

U.S. PATENT DOCUMENTS

| | | | |
|---|---|---|---|
| 7,613,572 B2* | 11/2009 | Ben-Gal et al. | 702/19 |
| 2002/0147754 A1* | 10/2002 | Dempsey et al. | 708/671 |
| 2003/0061015 A1* | 3/2003 | Ben-Gal et al. | 703/2 |
| 2004/0157556 A1* | 8/2004 | Barnett et al. | 455/41.2 |
| 2004/0250128 A1 | 12/2004 | Bush et al. | |
| 2005/0257269 A1* | 11/2005 | Chari et al. | 726/25 |
| 2005/0273274 A1 | 12/2005 | Evans et al. | |
| 2005/0275655 A1* | 12/2005 | Stolze et al. | 345/440 |
| 2006/0070128 A1* | 3/2006 | Heimerdinger et al. | 726/23 |
| 2006/0212279 A1 | 9/2006 | Goldberg et al. | |
| 2007/0087756 A1 | 4/2007 | Hoffberg | |
| 2008/0016314 A1 | 1/2008 | Li et al. | |
| 2008/0065765 A1* | 3/2008 | Hild et al. | 709/224 |
| 2008/0222725 A1 | 9/2008 | Chayes et al. | |
| 2008/0222726 A1 | 9/2008 | Chayes et al. | |
| 2008/0291934 A1* | 11/2008 | Christenson et al. | 370/412 |
| 2009/0021517 A1* | 1/2009 | Foslien | 345/440 |
| 2009/0138590 A1* | 5/2009 | Lee et al. | 709/224 |
| 2010/0017870 A1 | 1/2010 | Kargupta | |
| 2010/0071061 A1 | 3/2010 | Crovella et al. | |
| 2010/0082513 A1 | 4/2010 | Liu | |
| 2010/0107253 A1 | 4/2010 | Eiland | |
| 2010/0107254 A1 | 4/2010 | Eiland | |
| 2010/0107255 A1 | 4/2010 | Eiland et al. | |
| 2010/0132039 A1 | 5/2010 | Ji et al. | |
| 2011/0016525 A1* | 1/2011 | Jeong et al. | 726/23 |
| 2011/0029657 A1 | 2/2011 | Gueta et al. | |
| 2011/0066409 A1 | 3/2011 | Evans et al. | |
| 2011/0067106 A1 | 3/2011 | Evans et al. | |

FOREIGN PATENT DOCUMENTS

| | | | |
|---|---|---|---|
| WO | WO 2005/055073 A1 | 6/2005 | |

OTHER PUBLICATIONS

Ingham, K. L. and A. Somayaji, "A Methodology for Designing Accurate Anomaly Detection Systems," Latin America Networking Conference, San Jose, Calif.: ACM (2007).*

Munz, G., S. Li, and G. Carle, "Traffic anomaly detection using k-means clustering," Leistungs-, Zuverlassigkeitsund Verlasslichkeitsbewertung von Kommunikationsnetzen and Verteilten Systemen, 4 GI/ITG-Wks. MMBne, Hamburg, Germany (2007).*

Adriaans, P. and P. Vitanyi, "The Power and Perils of MDL," in IAIT Nice, France (2007).*

Grunwald, P. D., "The minimum description length principle," 2007, Cambridge, Mass., MIT Press, 703 (2007).*

Evans et al., Towards Zero-Day Attack Detection through Intelligent Icon Visualization of MDL Model Proximity: Extended Abstract, VizSec2008 Conference Poster (Sep. 15, 2008).*

Ragsdale et al., "Adaptation techniques for intrusion detection and intrusion response systems", 2000 IEEE International Conference on Systems, Man, and Cybernetics (Oct. 8, 2000).*

Evans et al., "Network attack visualization and response through intelligent icons", Military Communications Conference (MILCOM) (Oct. 21, 2009).*

Williamson, "Throttling viruses: restricting propagation to defeat malicious mobile code", Computer Security Applications Conference Proceedings (2002).*

Yang, Peng, Ward, Rundensteiner, "Interactive hierarchical dimension ordering, spacing and filtering for exploration of high dimensional datasets", IEEE Symposium on Information Visualization—INFOVIS 2003, pp. 105-112 (2003).*

Edward Tufte, The Visual Display of Quantitative Information, 2 ed., p. 119 (Graphics Press 2001).*

Jonah Turner, "Easy as Pie Charts (Any Way You Slice 'Em)", SAS Global Forum, Pager 071-2008 (Mar. 16, 2008).*

LeRoy Bessler, "Communication-Effective Pie Charts", SAS Global Forum 2007, Paper 134-2007 (2007).*

Keim, Kriegal, "Visualization techniques for mining large databases: a comparison", IEEE Transactions on Knowledge and Data Engineering, pp. 923-938 (1996).*

Keim, "Designing pixel-oriented visualization techniques: theory and applications", IEEE Transactions on Visualization and Computer Graphics, pp. 59-78 (2000).*

Hao, Keim, "Importance-driven visualization layouts for large time series data", IEEE Symposium on Information Visualization-INFOVIS 2005, pp. 203-210 (2005).*

Ferreira de Oliveira, Levkowitz, "From visual data exploration to visual data mining: a survey", IEEE Transactions on Visualization and Computer Graphics, pp. 378-394 (2003).*

Nonfinal Office Action dated May 6, 2011, in U.S. Appl. No. 12/882,637, filed Sep. 15, 2010, entitled "Network Attack Visualization and Response Through Intelligent Icons".

Nonfinal Office action dated Nov. 2, 2011, in U.S. Appl. No. 12/882,637.

* cited by examiner

NETWORK INTRUSION DETECTION VISUALIZATION

This application is directed to an invention(s) that was made as a result of activities undertaken within the scope of a Joint Research Agreement made between Lockheed Martin Corporation and the General Electric Company.

Embodiments of the present invention relate generally to methods and systems for network intrusion detection and, more specifically, to methods and systems for network intrusion detection using visualization of minimum description length (MDL) model proximity.

The increasing interconnectedness of communications systems is driving an increasing challenge for providing information assurance, such as, for example, providing access to data and services to legitimate users while prohibiting or blocking unauthorized use. Breaches in communications or data security can be costly. For example, a 2007 survey by the Computer Security Institute (CSI) Computer Crime and Security reported a per-incident cost of malicious activity at US$345K, more than double the reported per-incident cost in 2006. Other surveys have observed that the web-based attack rate has increased more than fifteen fold since 2005. One of the causes for these marked increases is the ineffectiveness of known intrusion detection systems to address increasing attack release rates, such that many modern malicious activities can escape detection. For military applications, not only can there be financial exposure, but also the risk of physical harm as well.

Intrusion detection systems (IDS) may rely on a wide range of measures to detect intrusions. Traditional network inspection and traffic intelligence systems may rely upon signature-based detection or protocol anomaly identification to discover suspicious or malicious activity. In these traditional systems, the more "normal" an intruder acts, the less likely the intruder will be found. Conversely, the less "normal" an intruder acts, the more likely a traditional method will be effective and the intruder will be discovered.

In an attempt to compensate for the limitations of signature or protocol anomaly methods, network security personnel may collect a wide variety of network activity data. This network activity data can include IDS alarms, full content, session data, and/or statistical data. The data collected may be manually mined for interesting activity. Also, personnel may rely on outside triggers or indications from alert data to prompt investigation of remaining data sources.

This traditional workflow may mean that the vast majority of data collected is often not inspected at all, although the data may be retained for a certain period of time to support network forensic investigations. Thus, there may be a need for an automated network activity data analysis and visualization system that can proactively identify intrusions and reduce the workload associated with traditional network data analysis.

In addition, once an attack is discovered and identified, in many cases a unique signature can be identified for that attack. Because the signatures for known attacks can be disseminated, it is possible that only a few known attacks may avoid detection. However, previously unknown (commonly known as "zero-day") attacks can often remain undiscovered until other observable events or symptoms such as, for example, a network slowdown or a rash of computer crashes, bring the attack to light.

Thus, there is a need for a network intrusion detection system and method that can, among other things, provide a tool for visualization of network activity data analysis and that can also address zero-day attacks.

One embodiment includes a network activity visualization system that includes a minimum description length (MDL) based network intrusion detection system having an MDL grammar database adapted to store a plurality of MDL grammars, and a pattern matching module adapted to match a received network activity data set against the MDL grammars by calculating a distance of the network activity data set from each MDL grammar. The system also includes an intelligent icon module coupled to the MDL-based intrusion detection system and adapted to receive the MDL grammars and distances of a network data set from each respective MDL grammar, and adapted to generate intelligent icons based on the MDL grammars and distances. The system further includes a display system adapted to display the intelligent icons so as to provide a visual indication of network security.

Another embodiment includes a network monitoring and visualization system that includes a computer coupled to a network and adapted to receive data from the network. The computer includes a computer readable medium having stored thereon software instructions for programming the computer to monitor the network and to provide a graphical visualization of monitored network activity, the software instructions, when executed by the computer, cause the computer to perform operations. The operations include retrieving a plurality of minimum description length (MDL) models, each model representing a different network activity behavior, and receiving network activity data corresponding to network activity. The operations also include compressing the network activity data using an MDL compression module to generate compressed network activity data, and characterizing the compressed network activity data using the MDL models, the characterizing including generating a plurality of statistical features each representing a relationship between the compressed network activity data and a respective one of the MDL models. The operations further include generating a plurality of graphical representations each corresponding to one of the statistical features, and displaying one or more of the graphical representations on a display device coupled to the computer, the graphical representations providing a visual indication of the corresponding statistical feature.

Another embodiment is a computer-implemented method of intrusion detection visualization. The method includes retrieving a plurality of minimum description length (MDL) models, each model representing a different network activity behavior, and receiving network activity data corresponding to network activity. The method also includes characterizing the network activity data using the MDL models, the characterizing including generating a plurality of statistical features each representing a relationship between the network activity data and a respective one of the MDL models, and associating each of a plurality of graphical representations with a corresponding one of the MDL models. The method further includes altering the appearance of each graphical representation based on the statistical feature of the corresponding MDL model, and displaying one or more of the graphical representations on a display device coupled to the computer, the graphical representations providing a visual indication of the corresponding statistical feature.

Another embodiment includes a network monitoring and visualization system. The system includes a computer coupled to a network and adapted to receive data from the network, the computer including a computer readable medium having stored thereon software instructions for programming the computer to monitor the network and to provide a graphical visualization of monitored network activity, the software instructions, when executed by the computer, cause the computer to perform operations. the operations include retrieving a plurality of minimum description length (MDL) models, each MDL model representing a different network activity behavior and each MDL model including a grammar having a plurality of motifs, and receiving a network activity data sample corresponding to network activity. The operations also include applying the grammar of each MDL model to the data sample to determine a measure of similarity between the data sample and the MDL model corresponding to the grammar being applied, and characterizing the data sample based on the measure of similarity, including mapping a normalized difference value for each motif of a grammar to a generate a plurality of statistical features. The operations further include generating a plurality of intelligent icons, each corresponding to one of the MDL models and each including a plurality of graphical representations corresponding to one of the statistical features representing the normalized difference value of a respective one of the motifs for that MDL model, and simultaneously displaying the intelligent icons on a display device coupled to the computer.

Another embodiment includes a network activity visualization system. The system comprises means for detecting network intrusions using an intrusion detection system having an mathematical model database adapted to store a plurality of mathematical models, and a pattern matching module adapted to match a received network activity data set against each mathematical model by calculating a distance of the network activity data set from a respective one of the mathematical models. the system also comprises means for generating intelligent icons based on the mathematical models and corresponding calculated distances. The system further comprises means for displaying the intelligent icons so as to provide a visual indication of network security.

Yet another embodiment includes a computer-implemented method of intrusion detection visualization. The method includes retrieving a plurality of minimum description length (MDL) models, each model representing a different network activity behavior, and receiving network activity data corresponding to network activity. the method also includes characterizing the network activity data using a computer programmed to perform intrusion detection visualization and the MDL models, the characterizing including generating, with the computer, a plurality of statistical features each representing a relationship between the network activity data and a respective one of the MDL models. The method further includes associating, with the computer, each of a plurality of graphical representations with a corresponding one of the MDL models, and altering, with the computer, the appearance of each graphical representation based on the statistical feature of the corresponding MDL model. The method also includes displaying one or more of the graphical representations on a display device coupled to the computer, the graphical representations providing a visual indication of the corresponding statistical feature.

DETAILED DESCRIPTION

In general, a grammar-based Minimum Description Length (MDL) compression algorithm is used to determine an attack based on closeness of fit to one or more compression model. Results of the MDL intrusion detection method described herein are mapped into a probability distributions and partitions representing algorithmic statistics. Results of the mapping and partitioning can then be represented as an intelligent icon.

Figure 1:
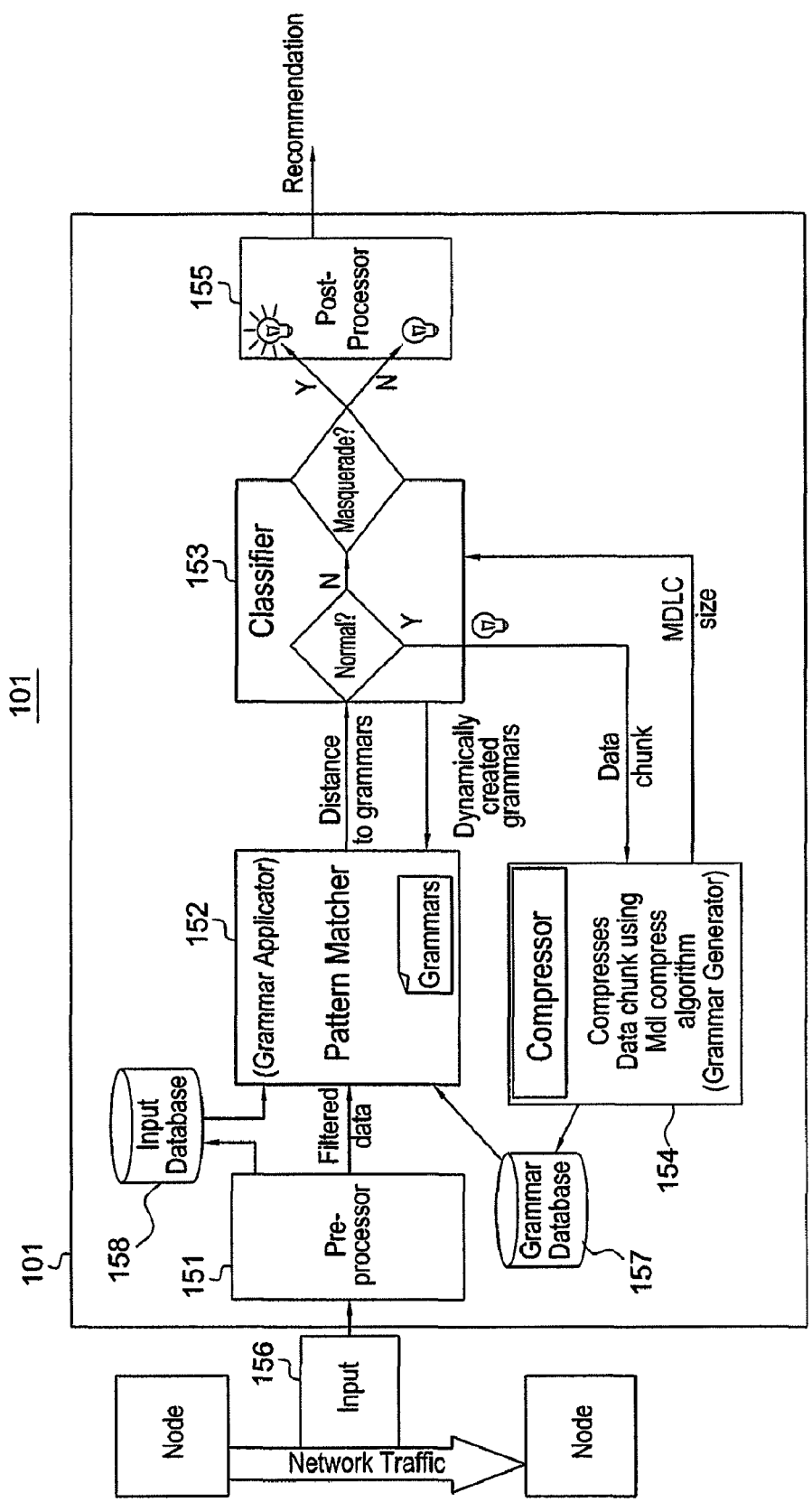
FIG. 1 is a network intrusion detection system according to various embodiments.

With respect to FIG. 1, there is shown a network intrusion detection system 100 according to various embodiments. As shown in FIG. 1, according to various embodiments the network intrusion detection system 100 can comprise a grammar inference engine 101 configured for intrusion detection and including a pre-processor 151 coupled to a grammar applicator (pattern matcher) 152, a classifier 153 coupled to the grammar generator 152, and to a grammar generator or compressor 154. According to various embodiments, the pre-processor 151 can be configured to receive an input data stream 156, and be configured to output filtered data to the grammar applicator 152. The grammar applicator 152 can be configured to apply grammars produced using a compression algorithm to the filtered or processed input data received from the pre-processor 151. The grammar generator 154 can be coupled to the classifier 153 and configured to generate grammars using the compression algorithm. In various embodiments, the grammar applicator 152 and grammar generator 154 can perform the same compression algorithm. Furthermore, in various embodiments, the grammar applicator 154 can calculate compression data by applying a grammar-based compression algorithm to a portion of the input data 156 associated with a particular user, as described herein. In addition, in various embodiments, the grammar applicator 154 can calculate a distance value based on a closeness of fit of discrete sequential portions of the input data stream 156 with one or more class models.

In various embodiments, the classifier 153 can be coupled to the grammar applicator 152, the grammar generator 154, and to a post-processor 155. The classifier 153 can compare grammars generated or identified by the grammar applicator 152 to the input data stream 156. In particular, the classifier 153 can be configured to determine a likelihood of fit between each portion of the input data stream 156 and the class models based on the distance calculation results provided by the grammar applicator 152. For example, the classifier 153 can be configured to determine to which of a number of learned compression models the input data, as processed or filtered by the pre-processor 151, is closest. In this regard, the classifier 153 can receive distance values from the grammar applicator 152 and decision criteria from the post-processor 155. Furthermore, the classifier 153 can send a grammar generation request to the grammar generator 154 and, optionally, can send dynamically generated grammars to the grammar applicator 152. Furthermore, the post-processor 155 may assign each of the sequential portions of the input data stream 156 to one of the class models. The post-processor 155 can also be configured to output a recommendation as to whether the input data stream 156 has been classified as an attack, thus detecting an attack on the network, or if normal behavior is determined, e.g., a healthy session. Further, the post-processor 155 can also output an indication of the assigned class model. In various embodiments, the classifier 155 in evaluating a particular input data stream can also take into consideration relevant information from one or more other input data streams.

For example, according to various embodiments, if input data is relatively "far" from all known normal and attack models, based on an expected information distance, then a potential zero day attack can be determined and a caution indication may be output. Alternatively, a zero day attack indication can be output upon the determination of a zero day attack, or simply an attack indication can be output. A compression model for the detected behavior may by calculated and stored for later use and/or reference and for further analysis. As used herein, a "zero day attack" can refer to an attack which is being observed in the first instance and has not previously been determined to constitute a learned attack model.

In various embodiments, multiple different types of attack models can be supported. For example, models can be provided for attacks associated with buffer overflow, JavaScript™, user-to-root, and scan traffic types of activities.

According to various embodiments, the grammar inference engine can further include a grammar database 157 operatively coupled to the grammar applicator 152 and the grammar generator 154. The grammar database 157 can include compression models such as, for example, health signature models and fault signature models formed using compressed data sets from application of a compression algorithm. The health signature models can include models associated with known healthy or normal session activity or behavior, and the fault signature models can include models associated with known attacks or other malicious or unauthorized activities. In various embodiments, the grammar applicator 152 can be configured to apply one or more of the compression models to the processed or filtered input data received from the pre-processor 151.

The grammar inference engine 101 can also include an input database 158 operatively coupled to the output of the pre-processor 151 and the input of the grammar applicator 152. In various embodiments, the input database 158 can store input data that is processed or filtered by the pre-processor 151. The grammar applicator 152 can then retrieve or obtain the filtered input data from the input database 158 independently of the data rate of the input data stream 156.

The pre-processor 151 can also be configured to apply a sliding window protocol to the input data stream that segments or divides the input data stream into discrete or separate portions of sequential information. Input data streams of various lengths can be supported such as, for example, input data streams of at least 1 KB in length. In various embodiments, the pre-processor 151 can filter the input data stream 156 by removing from consideration input data known to not be useful for harboring or supporting network attacks such as, for example, but not limited to, timestamp data.

According to various embodiments, the pre-processor 151 can also remove or filter packet payload components that could introduce ambiguities. Such unwanted components can be discarded or replaced with a discrete or binary value more amenable to classification. For example, various embodiments can include a Deterministic Finite Automata (DFA) model to eliminate "noise" inducing packet payloads from the input data stream 156. An example of such a DFA model is described in Ingham, K. L. and A. Somayaji, "A Methodology for Designing Accurate Anomaly Detection Systems," Latin America Networking Conference, 2007, San Jose, Calif.: ACM, which is hereby incorporated by reference. For example, in various embodiments, complex strings that have no intrusion detection information can be replaced with strings of X's or another no-operation code.

Furthermore, according to various embodiments, the pre-processor 151 can concatenate the input data stream payloads in receipt order, for input data that is not received sequentially or that is retrieved from a data store. In addition, the strings or requests monitored can be unidirectional to provide finer granularity. For example, monitored input data can include only client requests, only server responses, or both. Because the grammar generator 154 and grammar applicator 152 can each produce the same output (for example, compressed strings), both may also require input data to be pre-processed in the same way.

In various embodiments, the input data stream can be received from an information system. For example, the information system can be a communication network such as, for example, an intranet or the Internet. In such embodiments, the input data stream can comprise packetized digital information such as, for example, digital information provided in accordance with the Transport Control Protocol/Internet Protocol (TCP/IP), the HyperText Transport Protocol (HTTP), the Simple Mail Transport Protocol (SMTP), or the Uniform Datagram Protocol (UDP). However, the network intrusion detection system 100 can be used for intrusion detection by intercepting or monitoring an information path between any two or more nodes of any communication system or, further, between any two or more nodes of a network or a distributed computing system, according to any protocol which could be used for malicious activity. In such embodiments, the input data stream 156 can be a sequential data stream.

In various embodiments, requests from client to server can be monitored for intrusion detection. Examples of such monitored requests include, for example, but not limited to, HTTP request payloads. Monitoring of requests can be advantageous because an external HTTP-based attack must start with a query, and so detecting malicious activity in queries can provide early detection. Furthermore, server responses include a wide variety of data types, making normal HTTP server responses difficult to model. In addition, client requests are more easily classified than server responses.

In various embodiments, the grammar inference engine 101 can use a compression algorithm for classification of input data. For example, according to various embodiments, the grammar applicator 152 and grammar generator 154 can be configured to perform a Minimum Description Length (MDL) Compression (MDLC) algorithm to generate grammars. As used herein, the term "grammars" refers to a set of rules and relationships that are associated with particular data sequences. Furthermore, the term "model" or "compression model" as used herein refers to a set of one or more grammars with a probability distribution being associated with each grammar. For example, the grammar applicator 152 can take the MDLC-identified grammars and apply them to an unclassified input stream, and then calculate the unknown data's distance from the known data classes, as represented by their models. The distance values can then be passed on to the classifier 153.

In various embodiments, the grammar inference algorithm can use Minimum Description Length (MDL) principles taken from the theory of Kolmogorov Complexity and Algorithmic Information Theory to infer a grammar, finding patterns and motifs that aid most in compressing unknown data sets. In particular, the grammar inference engine can use such an algorithm to infer grammars and then apply those grammars to identify masquerades or other difficult to detect intrusion attacks. In addition, in various embodiments, the grammar inference engine 101 can be configured to detect anomalous, hostile, or attack events in linear time. Further information regarding MDL principles is provided in Grunwald, P. D., "The minimum description length principle," 2007, Cambridge, Mass., MIT Press. 703, and Adriaans, P. and P. Vitanyi, "The Power and Perils of MDL," in IAIT 2007, Nice, France, both of which are hereby incorporated by reference. An example of K means clustering is provided in Munz, G., S. Li, and G. Carle, "Traffic anomaly detection using k-means clustering," Leistungs-, Zuverlässigkeitsund Verlässlichkeitsbewertung von Kommunikationsnetzen und Verteilten Systemen, 4 GI/ITG-Wks. MMBne, 2007, Hamburg, Germany.

According to various embodiments, the MDLC algorithm can be utilized to form an estimate of the Randomness Deficiency (RDS) of a data sample, D, consisting of d elements with respect to model M of m elements, defined as:

$$\delta(D \mid M, d) \stackrel{\pm}{=} \log\binom{m}{d} - K(D \mid M, d),\qquad \text{Eq. 1.}$$

where $D \subset M$, and $\infty$ otherwise, and $K(D|M,d)$ is the Kolmogorov Complexity of data set D given M and d. Randomness deficiency estimates the degree that data sample D is atypical to the model M.

The MDLC algorithm can allow for the estimation of these values as follows:

$$K(D|M,d) = GA(D|M),\qquad \text{Eq. 2}$$

Where GA is the Grammar Applicator 152 that applies a previously learned MDLC model M on the data set D.

The data can be fit to model code, or the log of the estimated number or elements, in the typical set of which D is a proposed typical member, by:

$$\log\binom{m}{d} \approx MDLC(T)\frac{d_D}{d_T},\qquad \text{Eq. 3.}$$

which normalizes the log(size) of the typical set in a linear fashion based on the number of elements in the data sample, as compared to the compressed size and number of elements in the training set.

Furthermore, a linear normalization applied to the training data is obtained by applying the following:

$$\delta(D \mid M, d) = \left| MDLC(T)\frac{d_D}{d_T} - GA(D \mid M) \right|\qquad \text{Eq. 4.}$$

Figure 2:
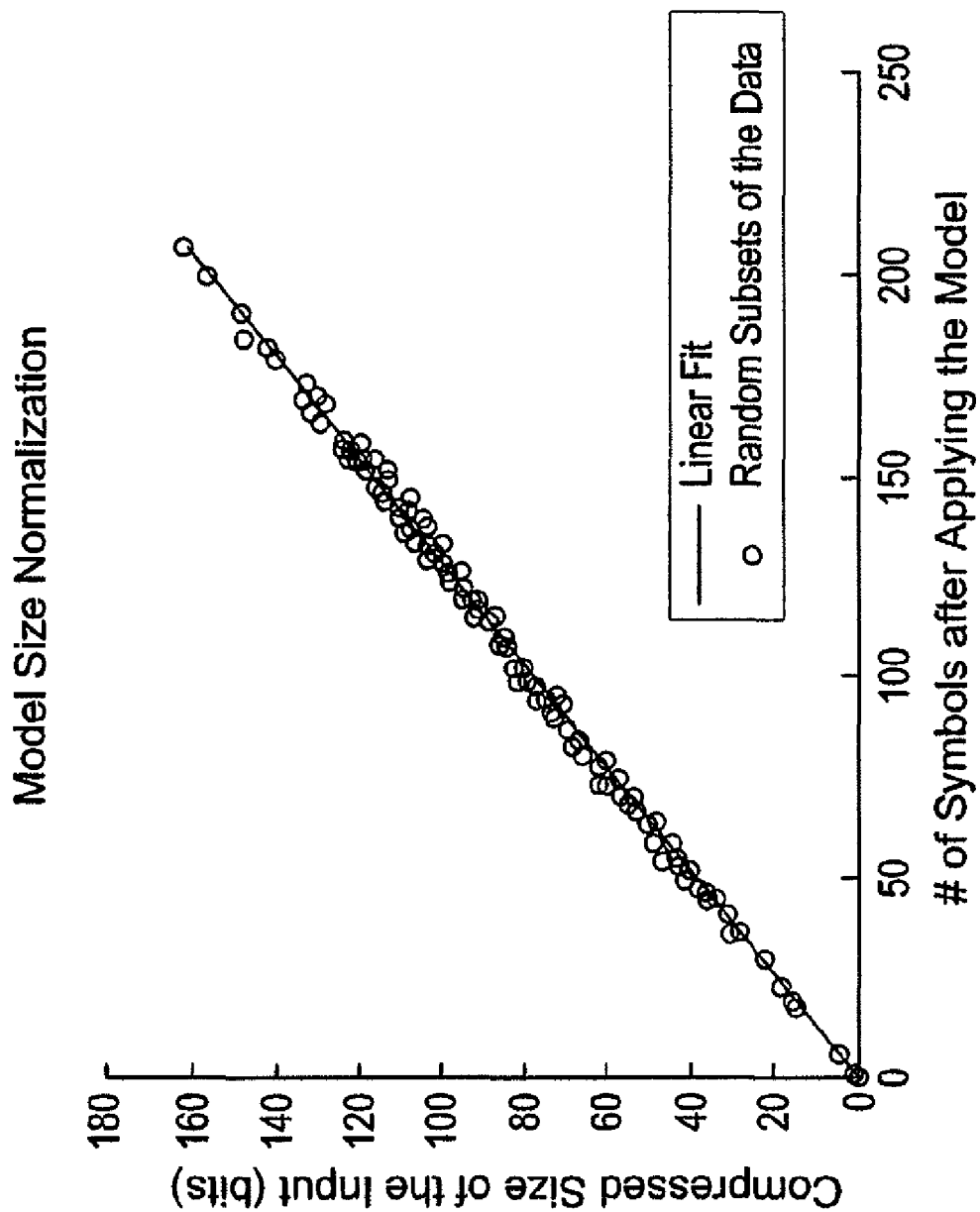
FIG. 2 illustrates a model size normalization relationship for a compressed size of input data based on a number of symbols after application of a compression method to obtain an estimate of randomness deficiency, according to various embodiments.

With regard to FIG. 2, there is shown a model size normalization relationship for the compressed size of the input based on the number of symbols after application of the MDL Compress method to obtain an estimate of RDS. Referring to FIG. 2, it can be seen that application of the MDL Compress compression algorithm to random subsets of training data provides a very linear characteristic of compressed file size versus the number of elements in the training data, d. Thus, various embodiments can include estimating RDS by applying the MDL Compress compression algorithm models to compress a data set, and comparing the result to an expected compression based on compression of similarly-sized training data.

In various embodiments, the grammar inference engine 101 can perform intrusion detection and, in particular, detection of zero day attacks, by evaluating data samples of the input data as follows. First, it is determined to which of a set of normal models and to which of a set of attack models the input sample is closest, where:

$$\delta_{Normal}(D \mid M, d) = \min_j \{\delta_j(D \mid M_j^{Normal}, d)\}.\qquad \text{Eq. 5}$$

is the normal model estimate of randomness deficiency, and:

$$\delta_{Attack}(D \mid M, d) = \min_i \{\delta_i(D \mid M_i^{attack}, d)\}.\qquad \text{Eq. 6}$$

is the attack model estimate of randomness deficiency.

Next, these determined randomness deficiencies can be screened to see if they are within a certain threshold. For example, a threshold could be selected of three standard deviations of both the attack and normal models. If a data sample is not determined to be close to either the attack or the normal models, then it can be flagged as a potential zero day attack. Input data samples that are within the threshold distance from either attack or normal models can be compared by forming a difference as follows:

$$\Delta\hat\delta(D|M,d) = \hat\delta_{Normal}(D|M,d) - \hat\delta_{Attack}(D|M,d)\qquad \text{Eq. 7}$$

In various embodiments, a positive value for $\Delta\hat\delta(D|M,d)$ according to Eq. 7 above can indicate classification as an attack, while a negative value can indicate a normal or healthy session. Furthermore, the more positive or negative the value, the stronger the confidence in the determination. In addition, values within some threshold from zero are candidates for evaluation as zero day attacks. In various embodiments, the compression algorithm can be executed with a speed n·log(n), where n is the number of compressed data sets.

Figure 3:
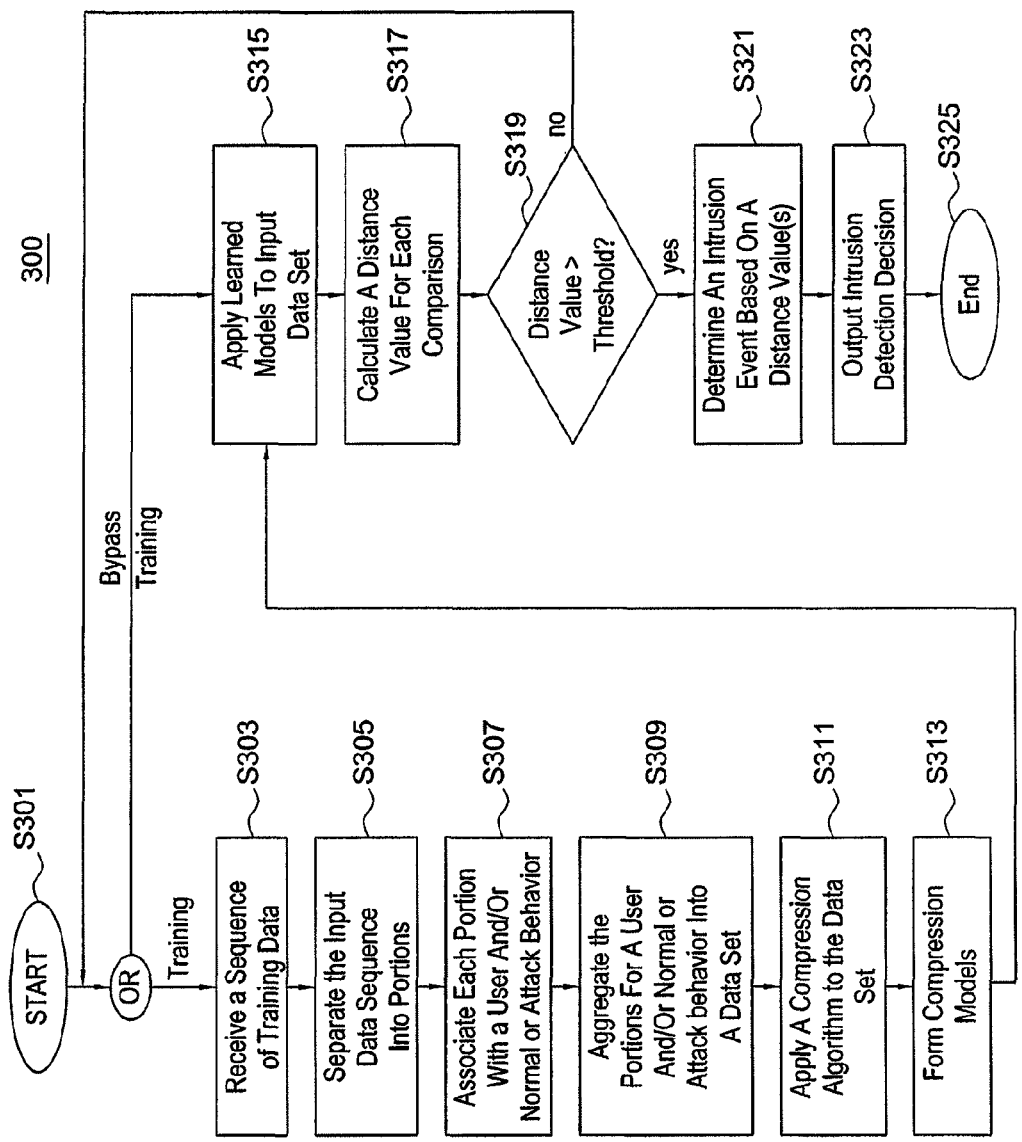
FIG. 3 is a flow chart illustrating a intrusion detection method according to various embodiments.

With regard to FIG. 3, there is shown a network intrusion detection method 300 according to various embodiments. Referring to FIG. 3, a network intrusion detection method 300 can commence at S301. If training or building of user grammars and/or models is to be performed, control can proceed to S303. If training or building of user grammars is not to be performed, then the method 300 can proceed to S315 to begin performing network intrusion detection. At S303, the method 300 can include receiving a sequence of training data. In at least one embodiment, selection of the training data to be tested can be received from an operator via a human-machine interface. The method can then proceed to S305 to separate the input data sequence into portions for processing. The method can then proceed to S307 at which the method can associate each portion with a user and/or normal or attack behavior. The method can then proceed to S309 to aggregate the portions for a user and/or normal or attack behavior into a data set. The method can then proceed to S311 to apply a compression algorithm to user data to build user grammars. The compression algorithm can be, for example, the MDL compression algorithm as described herein. The method can then proceed to S313 to form grammar models based on the results of the compression algorithm in S311. The method can then proceed to S315 to apply learned models to an input data set. The method can then proceed to S317 to calculate a distance value for each comparison. The method can then proceed to S319 where, if the calculated distance value exceeds a threshold, the method can proceed to S321. Otherwise, the method can return to S301.

At S321, the method can determine an intrusion event based on the distance value. According to various embodiments, for a zero day attack, S321 can further include updating the compression models to include the newly-determined attack model associated with the zero day attack. This can be accomplished upon receiving an instruction from a user or operator of the system 100 using a human-machine interface. Alternatively, the compression models can be automatically updated by, for example, the classifier 153, to include the newly-determined attack model associated with the zero day attack. The method can then proceed to S323, at the method can include outputting an indication of a network intrusion, following which the method can end at S325.

According to various embodiments, the steps S315 through S325 can be repeated as required for continued network intrusion detection. Furthermore, steps S303 through S313 can be repeated to build additional user grammars and/or models. However, in various embodiments, the step steps S303 through S313 can be optional. That is, the method 300 can perform network intrusion detection without training or using pre-built grammars/models. Furthermore, in at least one embodiment, once a compression model has been built as described above with respect to FIG. 3, the network intrusion detection method according to various embodiments can be consequently re-applied to input data sets and executed with a speed n·log(n), where n is the number of compressed data sets. Therefore, embodiments can perform network intrusion detection in real-time.

The inventors have found that embodiments of the present invention have low error rates compared to existing systems and methods. Table 1 below shows a distribution of HTTP client queries of an input data stream tested by the inventors.

TABLE 1

HTTP Client Queries For Various Traffic Types

| NORMAL | SCAN | USER-2 ROOT | JAVASCRIPT | BUFFER OVERFLOW |
|---|---|---|---|---|
| 4268 | 883 | 35 | 21 | 6 |

According to various embodiments, RDS can be used can be used as a distance measure. For example, the model to which the input data has the lowest RDS can determine the classification of the input data. Alternatively, compressibility can be used as the distance measure.

Figure 4:
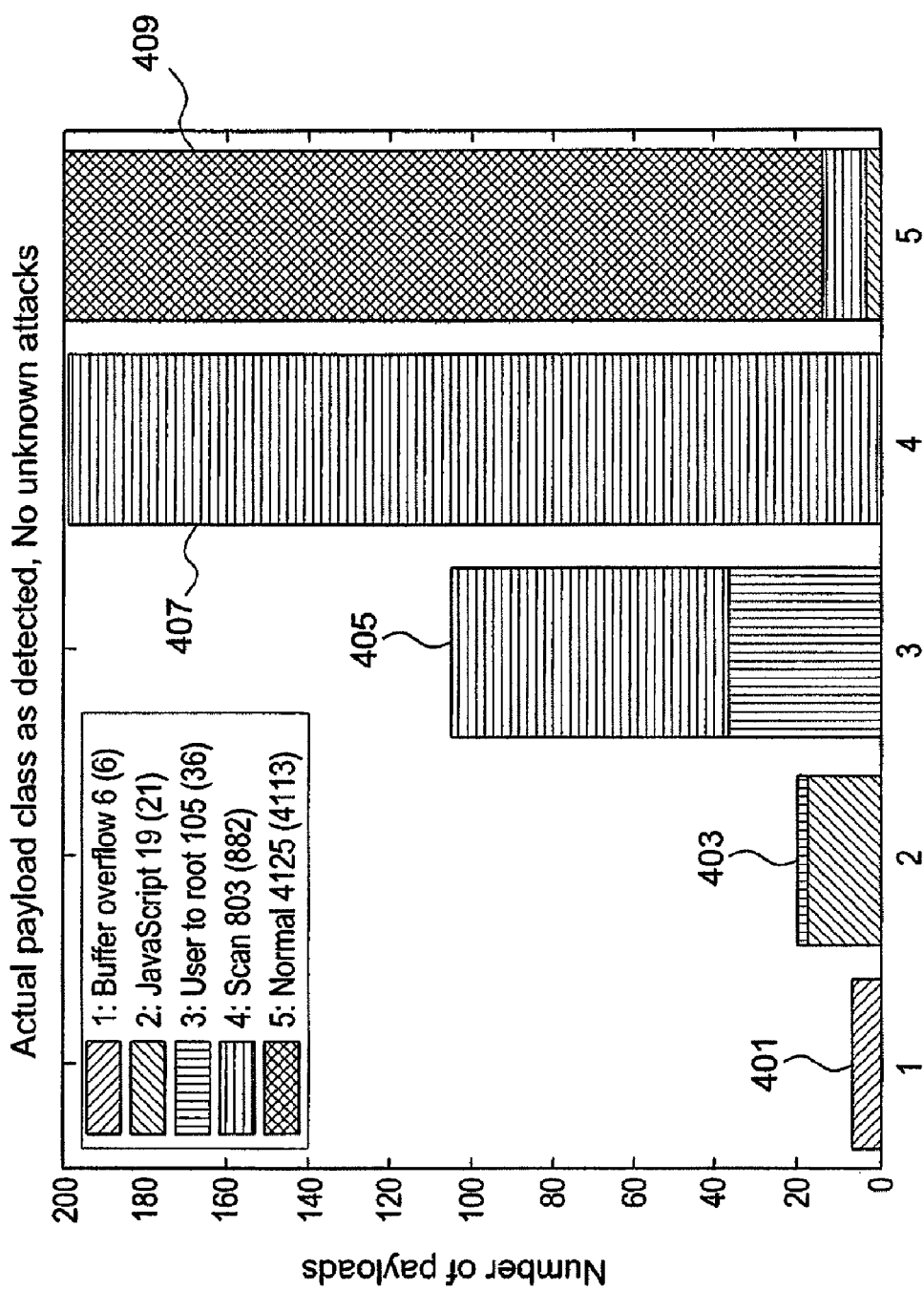
FIG. 4 is shown a bar chart illustrating classification of payloads of a sample data set according to four attack models and one normal model, where all attacks are known, in various embodiments.
Figure 5:
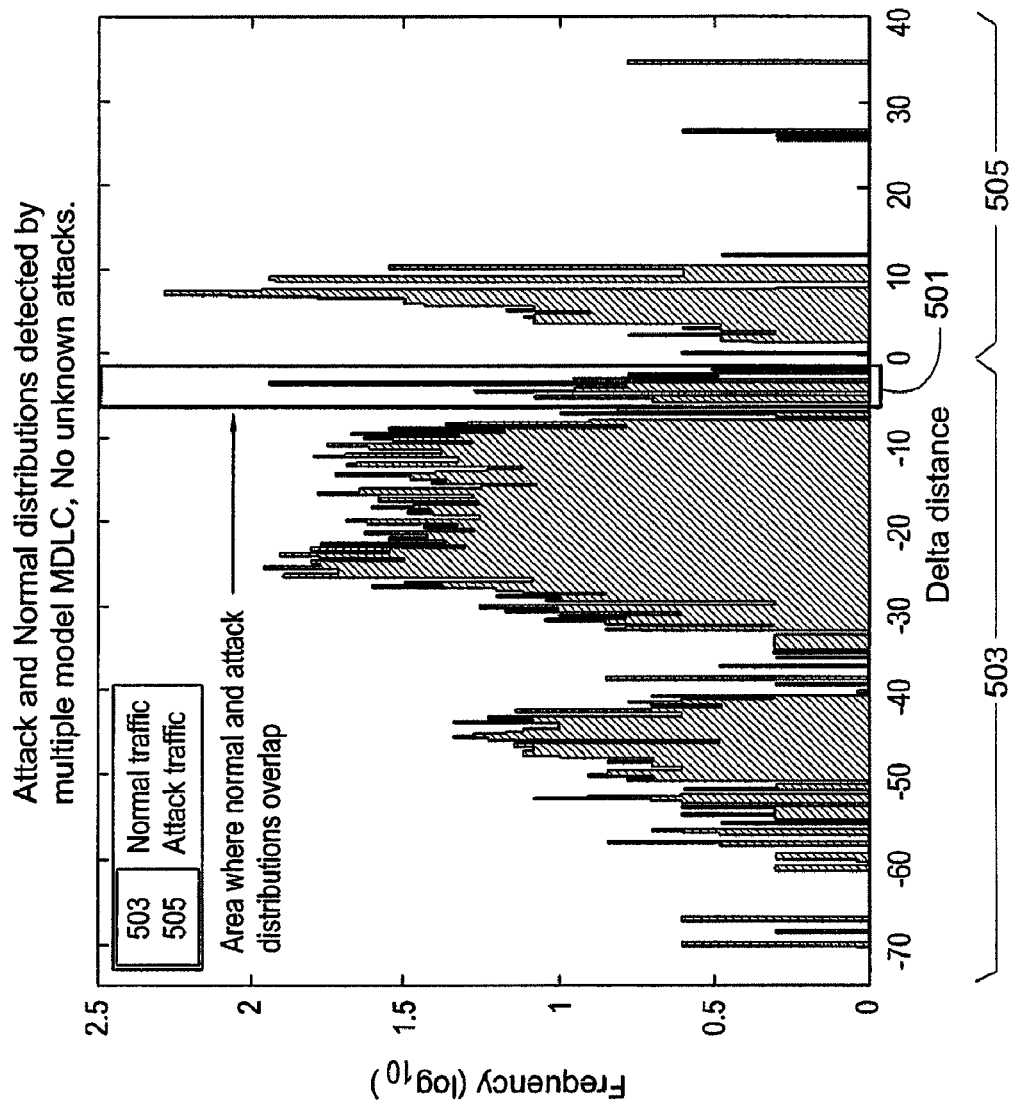
FIG. 5 is a histogram chart illustrating classification of payloads of a sample data set according to four attack models and one normal model, where all attacks are known, in various embodiments.

If $\Delta\hat{\delta}(D|M,d)$ quantifies the difference between the RDS of the data sample given the normal model and that given the best matching attack model. The closer these two values are, the less confident the classification decision. If RDS is an effective intrusion detection metric, then mis-classified payloads may only occur when $\Delta\hat{\delta}(D|M,d)$ is low. With respect to FIGS. 4 and 5, there is shown a bar chart and a histogram chart, respectively, indicating classification of payloads of a sample data set according to four attack models and one normal model, with none of the attacks being an unknown attack. Referring to FIG. 4, five classifications are shown: buffer overflow 401, JavaScript 403, User to root 405, Scan 407, and Normal 409. In the results shown in the histogram of FIG. 5, only one false positive classification (false alarms) is shown, and thirteen false negatives (missed attacks) are shown for the sample data set. Only JavaScript and Scan attacks were not detected. The histogram shows that these mis-classifications were weakly classified, as shown at the mis-classification area 501, where the distributions overlap. The normal distribution's shape can be tri-modal.

Figure 6:
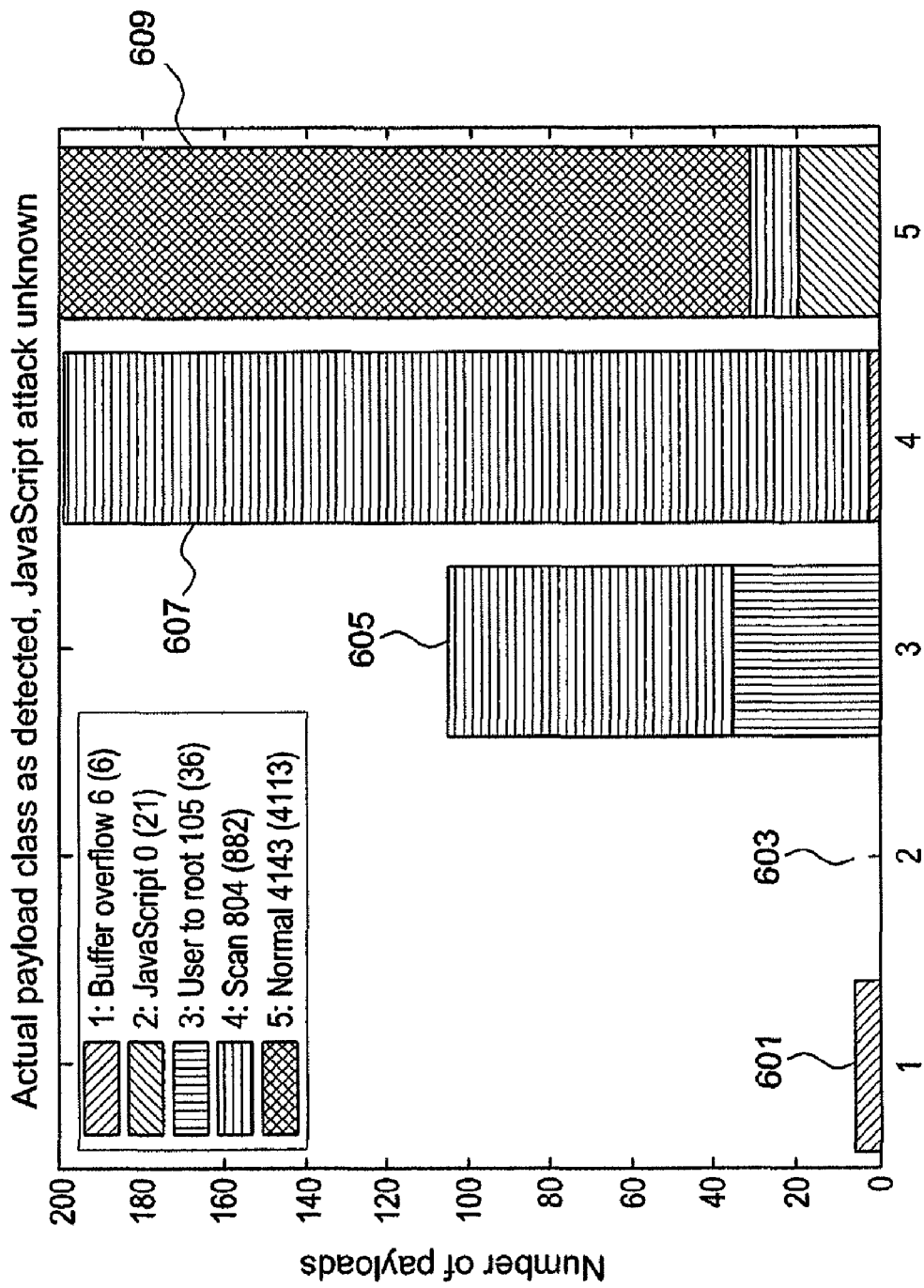
FIG. 6 is shown a bar chart illustrating classification of payloads of a sample data set according to four attack models and one normal model, where one attack is unknown, in various embodiments.
Figure 7:
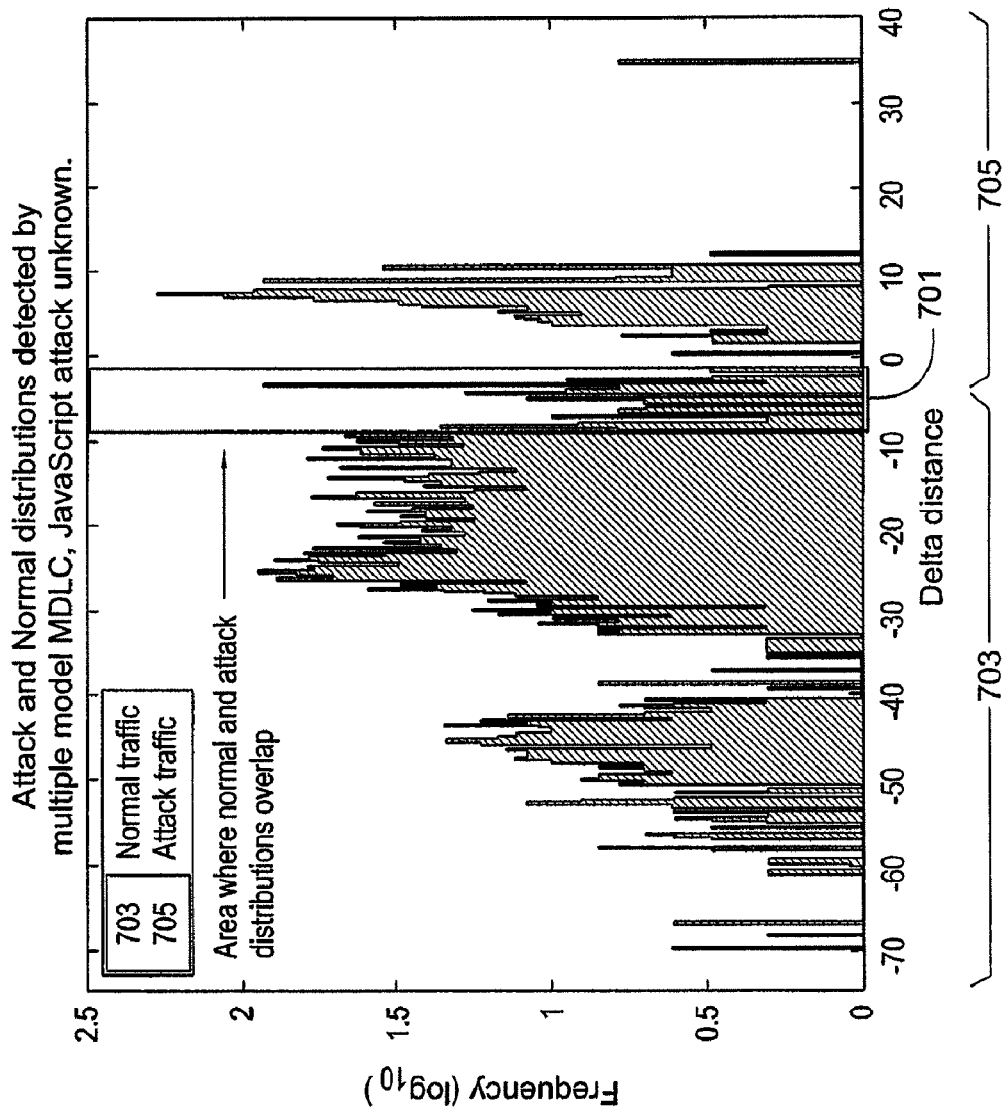
FIG. 7 is a histogram chart illustrating classification of payloads of a sample data set according to four attack models and one normal model, where one attack is unknown, in various embodiments.

Furthermore, with respect to FIGS. 6 and 7, there is shown a bar chart and a histogram chart, respectively, indicating classification of payloads of a sample data set according to a JavaScript attack taken as an unknown attack (for example, a zero day attack). Referring to FIG. 6, five classifications are shown: buffer overflow 601, JavaScript 603, User to root 605, Scan 607, and Normal 609. In the results shown in the histogram of FIG. 7, it is seen that all JavaScript attacks were mis-classified as normal. In the histogram of FIG. 7, the mis-classifications occur in the interval 701 where the attack and normal distributions overlap. Comparing the results to those for no un-modeled attacks in FIGS. 4 and 5, it is shown that the errors fall in a low confidence zone and, as with FIG. 5, they fall within the mode where the normal model is weakest. However, the system 100 and method according to various embodiments had an overall error rate of 10.6%, which accuracy is better than known methods.

Figure 8:
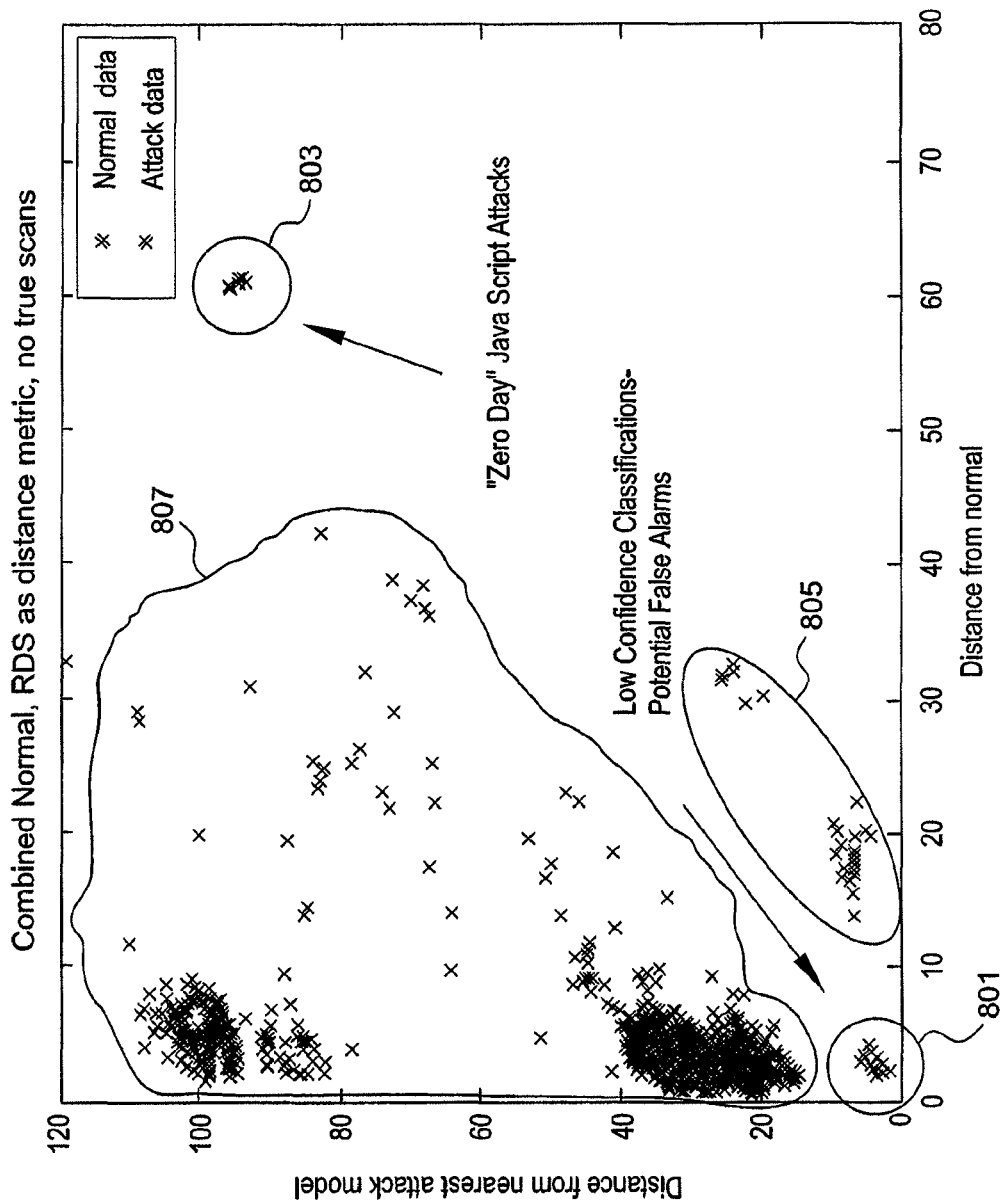
FIG. 8 is a chart showing a receiving operating characteristic curves in accordance with various embodiments.

With respect to FIG. 8, there is shown an example output display 800 illustrating classification to one or more compression models, according to various embodiments. In various embodiments, the output intrusion detection decision can be an indication such as, for example, an alarm output provided to a user via a display (such as, for example, output display 800), illumination of a Light Emitting Diode (LED), hardcopy printout, transmission of an alarm or alerting message to a communications device, computing device, or telecommunications terminal, or other audible or visual alarms.

For example, FIG. 8 and Table 2 illustrate detection accuracy for each scenario. The ROC curve for Scan as an unknown can be substantially lower than the rest. As can be seen in FIG. 8, classifications with lower confidence levels 801 can have a higher potential false alarm rate. Furthermore, zero-day attacks 803 can have relatively higher distance from both normal models 807 and attack models 805.

Figure 9:
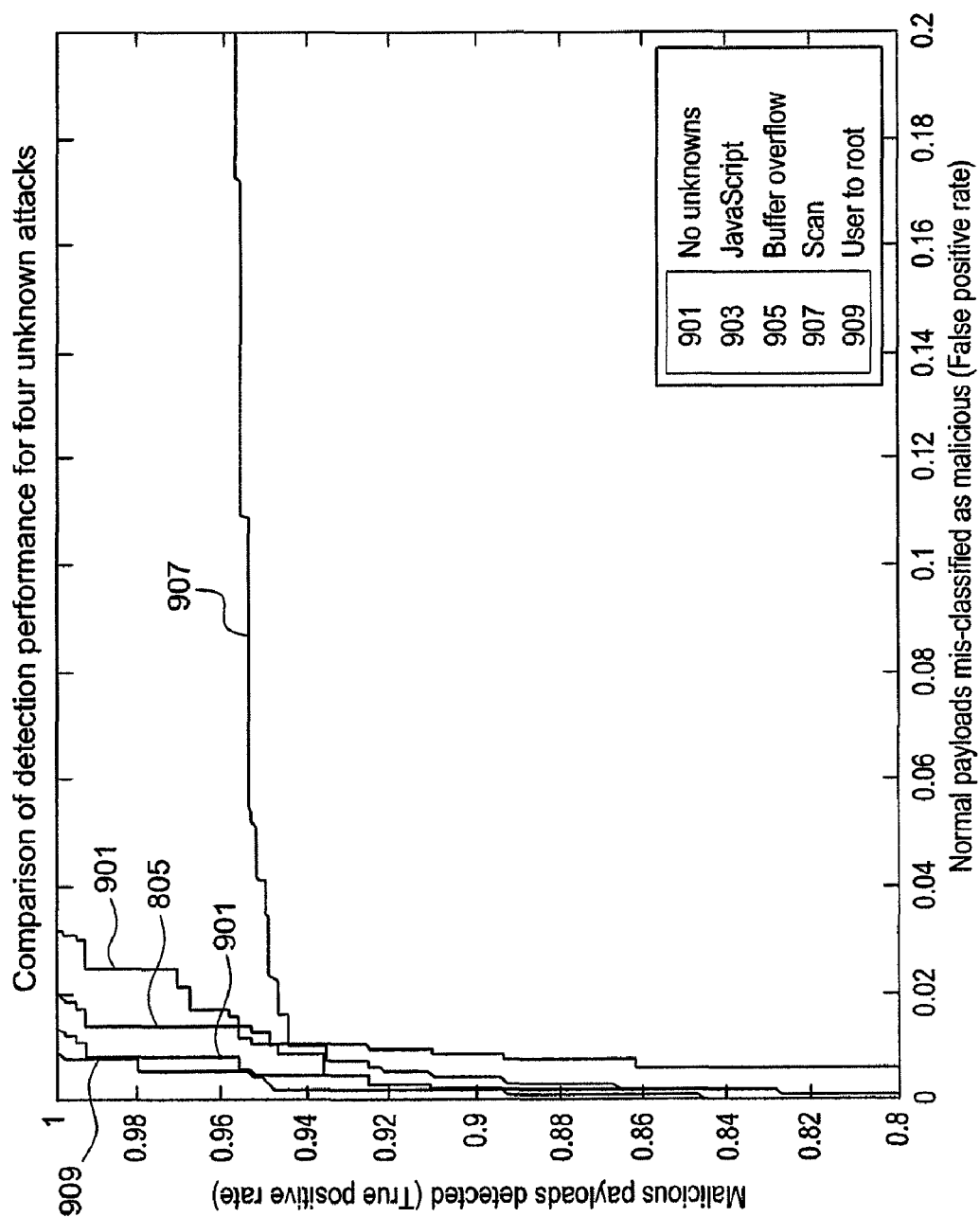
FIG. 9 is an example output display illustrating classification to one or more compression models according to various embodiments.

With respect to FIG. 9, there is shown a series of receiver operating characteristic (ROC) responses for the network intrusion detection system 100 for the five exemplary detection events of FIGS. 6 and 7. As shown in FIG. 9, the detection accuracy can decrease for zero-day attacks with respect to the known attacks. According to various embodiments, the threshold for detection or classification of an attack can be selected to conform to one of the ROC curves.

The false alarm rate in particular has been problematic for existing systems and methods. Table 2 below shows joint probability values of detection for the ROC responses of FIG. 9.

TABLE 2

Joint probability values for detection

| Attack type | AUC | $T_+$ | $F_+$ | $T_-$ | $F_-$ |
|---|---|---|---|---|---|
| None | .9994 | .4997 | .00370 | .4963 | .00401 |
| User to root | .9988 | .4885 | .00374 | .4965 | .00146 |
| JavaScript | .9986 | .4959 | .01217 | .4879 | .00402 |
| Buf. overflow | .9930 | .4959 | .00688 | .4931 | .00401 |
| Scan | .9701 | .4733 | .00794 | .4920 | .0268 |

In at least one embodiment, the false alarm rate (for example, the probability that a target data sequence classified as an attack is actually a normal session) was found to be between 0.00370 and 0.01274. Furthermore, in at least one embodiment, the missed attack rate (for example, the probability that a target data sequence classified as normal is actually an attack) was found to be between 0.00146 and 0.0268. In addition, embodiments are effective to detect zero-day attacks, or previously unknown or un-modeled attack scenarios. In at least one embodiment, the zero-day attack total error rate was found to be 10.6%.

Figure 10:
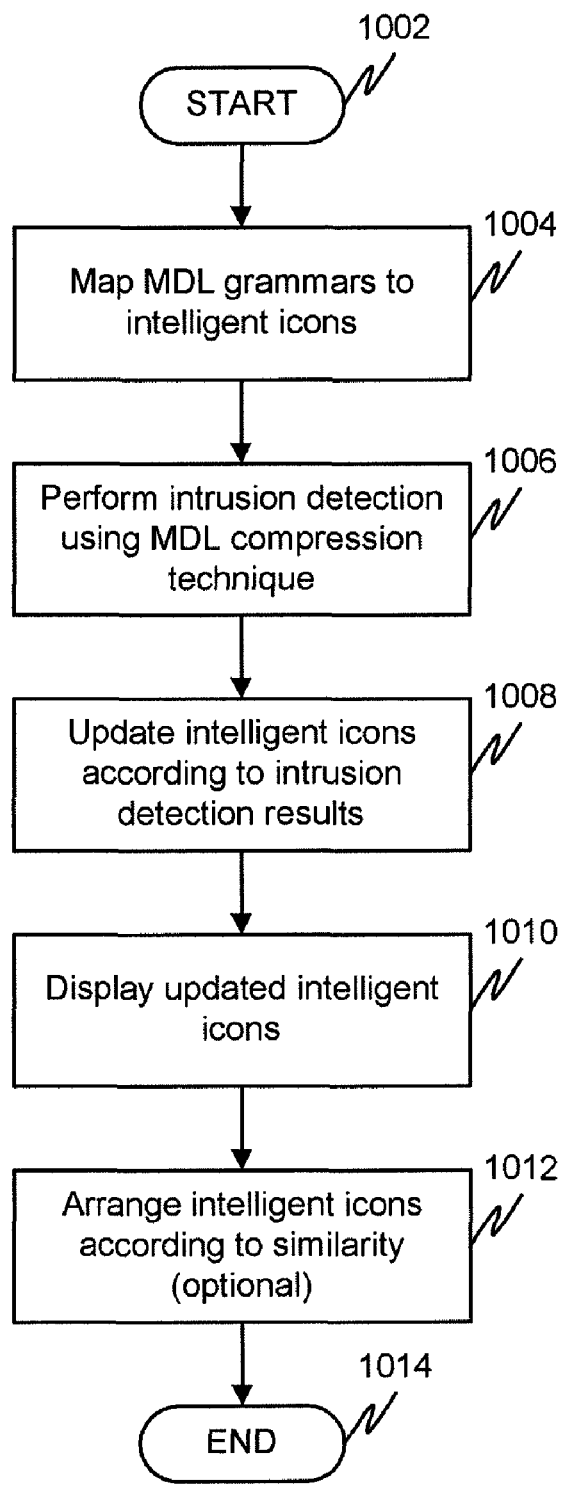
FIG. 10 shows a flowchart of an exemplary method for intrusion detection visualization.

FIG. 10 shows a flowchart of an exemplary method for intrusion detection visualization. In particular, processing starts at 1002 and continues to 1004.

At 1004, grammars produced by an MDL compression module are mapped to graphical representations. The graphical representations can be intelligent icons. An example of intelligent icons is described in "Intelligent Icons: Integrating Lite-Weight Data Mining and Visualization into GUI Operating Systems," Keogh, E., Wei, L., Xi, X., Lonardi, S., Shieh, S., Sirowy, S., ICDM 2006, which is incorporated herein by reference.

In general, an intelligent icon system operates by replacing standard icons (which are typically static) with automatically generated icons (e.g., icons that may be dynamically updated in response to changes in data). The intelligent icons can have a feature (or features), such as graphic image, size, shape, and/or color, that represents one or more underlying data values. For example, in the case of network intrusion detection, the intelligent icon can represent one of the MDL grammars and the color of the icon can represent the proximity of a network data set to the particular MDL grammar. One or more of the intelligent icons can be displayed simultaneously on a display device.

By providing a visualization of a the proximity of a network data set to the MDL grammars, a network security operator can visually assess multiple dimensions of similarity as an aid to classification and labeling of the network data set. In addition to providing a visual indication of a data set's proximity to normal and attack MDL grammars, the system can also provide a visual indication that a network activity data set is not similar to known normal or attack MDL models, and therefore is potentially a zero-day attack.

The system can present some or all of the intelligent icons to the operator. For example, the system can present the intelligent icons corresponding to the most similar models to the operator for visualization. The intelligent icons can be arranged according to their similarity, in a way much like traditional icons can be arranged by name, date, size, type, etc. By arranging the icons by their similarity, a network security operator can see, for example, all of the MDL grammars arranged by their proximity to the network data set being analyzed. Processing continues to 1006.

At 1006, an intrusion detection process is performed using the MDL compression technique described above. Processing continues to 1008.

At 1008, the intelligent icons are updated according to the results of the intrusion detection performed at 1006. Processing continues to 1010.

At 1010, the updated intelligent icons are displayed on a display device. The display device can be local to the system performing the intrusion detection and intelligent icon update, or can be a remote display. Also, a mobile display device can be used, such as a laptop, wireless communications device, personal digital assistant (PDA), netbook, or the like. Processing continues to 1012.

At 1012, the intelligent icons are optionally arranged according to similarity. Processing continues to 1014, where processing ends.

It will be appreciated that 1002-1012 can be repeated in whole or in part in order to perform a contemplated network intrusion visualization task.

Figure 11:
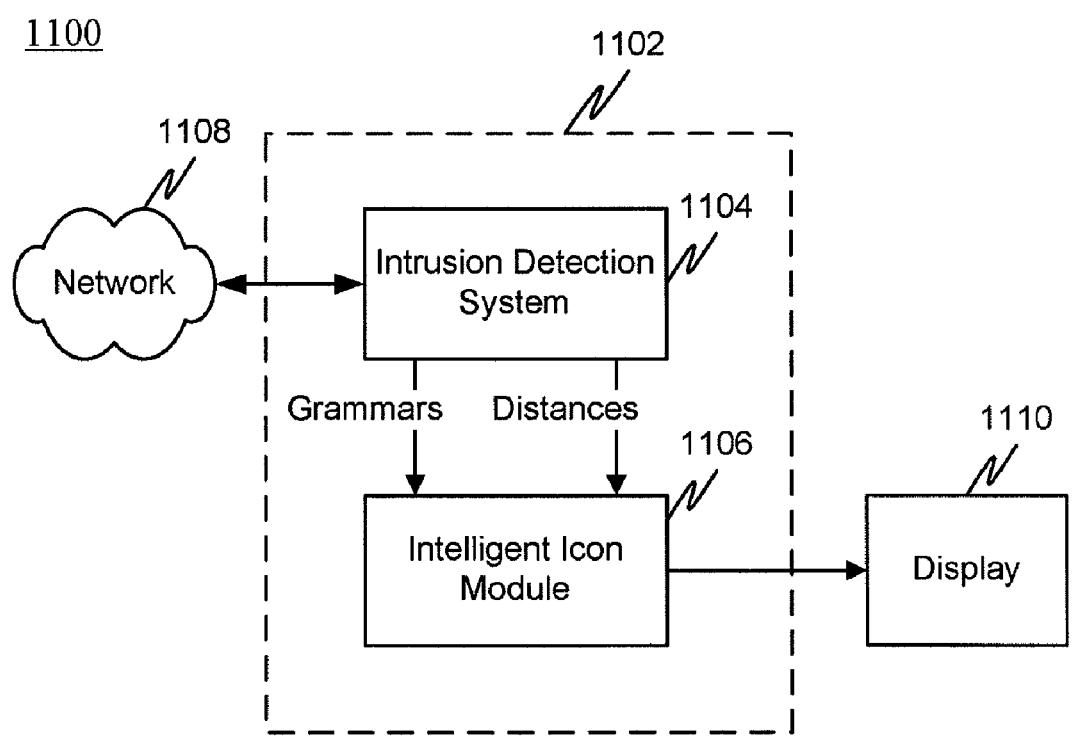
FIG. 11 is a diagram of an exemplary intrusion detection visualization system.

FIG. 11 is a diagram of an exemplary intrusion detection visualization system. In particular, a system 1100 includes an intrusion detection computer 1102 having an instruction detection system 1104 and an intelligent icon module 1106. The system 1100 is coupled to a network 1108 and a display 1110.

In operation, the intrusion detection system 1104 receives data from the network 1108 and performs the MDL-based intrusion detection method described above. The intrusion detection system 1104 communicates grammars and distances to the intelligent icon module 1106. The intelligent icon module 1106 updates the intelligent icons (as described above) for display on the display 1110.

Figure 12:
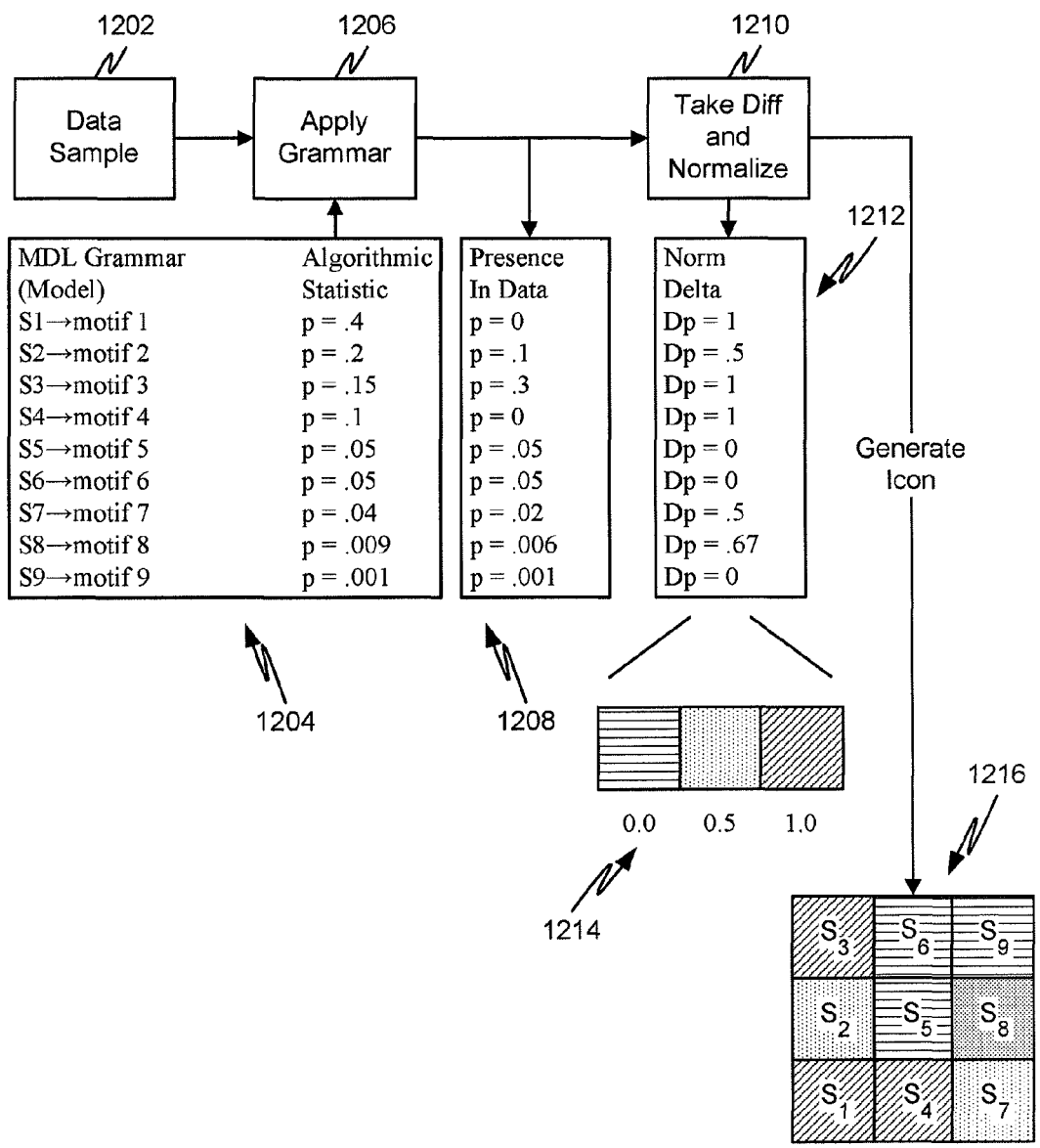
FIG. 12 is a diagram showing a data flow for generating an intelligent icon according to various embodiments.

FIG. 12 is a diagram showing a data flow for generating an intelligent icon according to various embodiments. In particular, a data sample 1202 and an MDL model 1204 are processed by applying a grammar of the MDL model 1204 to the data sample 1202. The MDL model 1204 includes a grammar made up of one or more motifs (or components or units each representing a portion of data making up network activity the model is used to represent). In the example shown in FIG. 12, the MDL model 1204 includes nine motifs. For the given model, the nine motifs range in statistical occurrence rates from 0.4 for motif 1, to 0.001 for motif 9. The occurrence rate, in this example, can be correlated with the relative importance of that motif to the model. In other words, if a model includes a high occurrence rate of a particular motif (e.g., motif 1 in the MDL model 1204), then that motif is likely to be important to the model and can be given greater emphasis in the presentation and visualization. For example, emphasis may correspond to placement of a graphical element, or the size, shape or other visual feature of a graphical element may be used to indicate relative importance of the motif represented by that graphical element.

Also, the motifs of an MDL model grammar serve to partition a network data sample. In other words, each motif identifies the portion of the data that corresponds to that motif. In this way, the MDL model grammar can partition the data sample not according to an expected data arrangement or signature, but rather according to the portions of data represented by the motifs. By recognizing the motifs that make up a particular model rather than an expected sequence of data, the MDL model intrusion detection approach can be more robust at detecting intrusions and recognizing attempts to mask the signature of an exploit or attack data stream.

Once the MDL model 1204 grammar has been applied to the data sample 1202, a measure of presence (or occurrence) 1208 of each motif in the data can be generated. A delta (or difference) can be computed between the statistical distribution of the MDL model 1204 and the measure of presence 1208. The difference data can be normalized to produce normalized difference data 1212.

Each value of the normalized difference data 1212 can then be mapped to a graphical display property. In FIG. 12, the normalized difference values have been mapped to fill patterns 1214. It will be appreciated that other graphical features can be mapped to the normalized values such as color, size, shape, text, or the like. In general, any method for graphically representing a numerical value may be used.

In the example shown in FIG. 12, a normalized difference value of 0 is mapped to a horizontal line fill pattern, a normalized difference value of 0.5 is mapped to a dot fill pattern and a normalized difference value of 1.0 is mapped to a diagonal line fill pattern. The mapping of the fill patterns to the normalized difference values is used to generate an intelligent icon 1216.

In the intelligent icon 1216, each square represents a motif and the fill pattern for that square maps to the normalized difference value for that motif. For example, motif 1 should occur at a rate of 0.4 in a data sample that correspond to the MDL model 1204. In the data sample 1202 being analyzed, motif 1 was not present at all, as shown in the first data line of the measure of presence 1208. This produces a normalized difference of 1 (in other words there is a one hundred percent difference between the expected occurrence rate of the model motif and the actual occurrence rate in the data sample). This maps to a diagonal line fill pattern which is used to fill square $S_1$ of the intelligent icon 1216.

Square $S_1$ of the intelligent icon 1216 is located in the lower left position of the intelligent icon. As discussed above, the placement of a graphical element can be used to represent its relative weight or importance in the model. Here, in the example of FIG. 12, the most frequently occurring (e.g., here most "important") motifs are placed in the lower left corner, with motifs of lesser importance being placed above and to the right across the intelligent icon. Establishing a known placement system can help network security operators to gauge not only the overall similarity of a data sample to a model, but to also determine, within that model, which elements of the model correlate most closely with the data sample. This information can be used to further refine the process of identification of network intrusions. It will be appreciated that the most important or heavily weighted motif of a model my not necessarily be the most frequently occurring. For example, a particular attack model may have a motif that would be required for that model, but which may occur few times. In this case, the system would place a greater weight or importance on that motif even though it is not a frequently occurring motif. So, an MDL model statistical distribution could be weighted to place emphasis on a motif that is important to the model, but which does not otherwise occur frequently. A weight table, or other similar data structure, could be used to weight the statistical distribution of an MDL model.

Figure 13:
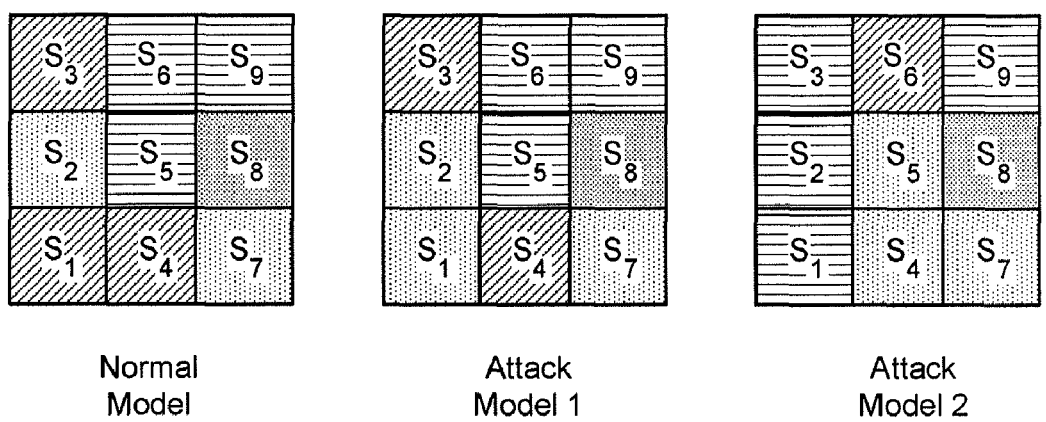
FIG. 13 is a diagram of an exemplary network intrusion detection visualization display in accordance with various embodiments.

FIG. 13 is a diagram of an exemplary network intrusion detection visualization display in accordance with various embodiments. In particular, FIG. 13 shows three intelligent icons: a normal activity icon, an attack model 1 icon and an attack model 2 icon, each representing application of their respective MDL model to a network activity data sample. In practice, a network intrusion detection visualization system according to the present disclosure, could provide a display similar to that shown in FIG. 13. An operator may wish to see a data sample compared to various MDL models including normal and attack models. In this way, an operator may gain a visual insight into the nature of the network activity producing the data sample and also, as discussed above, within each model, those parts that are most similar to the data sample.

The intelligent icons of FIG. 13 are arranged like the intelligent icon 1216 of FIG. 12 in that the graphical elements representing the most frequently occurring or most important motifs are placed in the lower left corner. Also, the same fill pattern mapping scheme as that shown in FIG. 12 is being followed in the example of FIG. 13.

From the intelligent icons, it is clear that the data sample is not correlating with the normal model, because there are large differences in the lower left corner elements, as shown by the diagonal fills in some of those elements. The data sample appears to be correlating moderately well to the attack model 1 MDL model. This is illustrated by the mid-range normalized difference values in the lower left elements as shown by the dot fill patter. The data sample appears, in this example, to be most closely correlated with the attack model 1 MDL model. This is shown by the small differences with respect to the important elements (e.g., S1-S3) as indicated by the diagonal fill pattern in those elements. From this display, an operator would be able to determine that the network data being analyzed appears to match the behavior associated with the attack model 2 MDL model. The operator could then take appropriate action based on the intrusion detection visualization display. As the example in FIG. 13 shows, data generated by processing a data sample and comparing with multiple features of multiple MDL models can be readily visualized using an embodiment. Three intelligent icons are shown for purposes of illustrating features. It will be appreciated that more or less intelligent icons could be displayed and could be arranged in other ways such as grids. Also, while square icons are shown with square features, it will be appreciated that other graphical elements could be used. In addition to graphical elements, audible or other indications could also be used to represent relative similarity between a data sample and an MDL model. For example, if a data sample is within a certain distance of an attack MDL model, a system may provide a visually and/or audible alarm (or other suitable type of alarm) to alert an operator. Although, the exemplary embodiments have been described using MDL models, it will be appreciated that any mathematical, or other, model, method or process capable of performing functions similar or equivalent to those described in connection with MDL models can be used.

It will be appreciated that the modules, processes, systems, and sections described above can be implemented in hardware, software, or both. For example, the grammar inference engine 101 and/or visualization system can be implemented, for example, using a processor configured to execute a sequence of programmed instructions. The processor can be for example, but not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as C++. The instructions can also comprise code and data objects provided in accordance with, for example, the Visual Basic™ language, or another object-oriented programming language. The sequence of programmed instructions and data associated therewith can be stored in a computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor. Also, the processes, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the method, system, or a computer program product (software program).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the mechanical and/or computer programming arts.

Moreover, embodiments of the disclosed method, system, and computer program product can be implemented in software executed on a programmed general purpose computer, a special purpose computer, a microprocessor, or the like.

In various embodiments, the grammar database 157 and the input database 158 can be implemented using any commercial database or database management system such as, for example, Oracle Database 11 g available from Oracle Corporation of Redwood Shores, Calif.

It is, therefore, apparent that there is provided, in accordance with the various embodiments disclosed herein, a network intrusion detection visualization system and method. A grammar-based Minimum Description Length (MDL) compression algorithm is used to determine and visualize an attack based on closeness of fit to one or more compression models. Attacks detected and visualized can include zero-day attacks.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the appended claims.

What is claimed is:

1. A network monitoring and visualization system comprising:
   a computer coupled to a network and adapted to receive data from the network, the computer including a computer readable medium having stored thereon software instructions for programming the computer to monitor the network and to provide a graphical visualization of monitored network activity, the software instructions, when executed by the computer, cause the computer to perform operations including:
   retrieving a plurality of minimum description length (MDL) models, each MDL model representing a different network activity behavior and each MDL model including a grammar having a plurality of motifs;
   receiving a network activity data sample corresponding to network activity;
   applying the grammar of each MDL model to the data sample to determine a measure of similarity between the data sample and the MDL model corresponding to the grammar being applied;
   characterizing the data sample based on the measure of similarity, including mapping a normalized difference value for each motif of a grammar to a generate a plurality of statistical features;
   generating a plurality of intelligent icons, each corresponding to one of the MDL models and each including a plurality of graphical representations corresponding to one of the statistical features representing the normalized difference value of a respective one of the motifs for that MDL model;
   simultaneously displaying the intelligent icons on a display device coupled to the computer;
   determining a relative importance of a corresponding motif within the MDL model associated with that motif;
   arranging the graphical representations based on the relative importance of the corresponding motif within the MDL model associated with that motif; and
   dynamically updating the intelligent icons in response to changes in data associated with each respective intelligent icon, such that the intelligent icons displayed on the display device represent only the most recent data values of the corresponding MDL model.

2. The system of claim 1, wherein the characterizing includes calculating a proximity between the data sample and the one or more MDL models.

3. The system of claim 1, wherein the network activity is classified as normal activity or threat activity based on the characterization of the data sample.

4. The system of claim 1, wherein the network activity is classified as a zero day attack when the data sample is determined to have a distance from each of the MDL models that is above a predetermined threshold.

5. The system of claim 1, wherein the MDL models include a group of normal network activity models and a group of attack network activity models, and wherein intelligent icons corresponding to both groups are displayed simultaneously.

6. The system of claim 5, wherein the statistical features indicate whether the network activity data is more likely correlated with the group of normal network activity MDL models or with the group of attack network activity MDL models.

7. The system of claim 1, wherein the statistical features indicate a proximity of the network activity relative to one or more of the MDL models.

8. The system of claim 1, wherein the statistical features indicate that the network activity data represents a new network behavior when the statistical features exceed a threshold distance from the MDL models.

9. The system of claim 1, wherein the operations further include partitioning the network activity data sample according to the motifs of the MDL models in which each motif identifies a portion of the network activity data sample corresponding to that motif.

10. A network activity visualization system comprising:
means for detecting network intrusions using an intrusion detection system having a mathematical model database adapted to store a plurality of mathematical models, and a pattern matching module adapted to match a received network activity data set against each mathematical model by calculating a distance of the network activity data set from a respective one of the mathematical models, the mathematical models including a plurality of minimum description length (MDL) models, each MDL model comprising a grammar having a plurality of motifs;
means for generating a plurality of intelligent icons, each corresponding to one of the MDL models and each intelligent icon including a plurality of graphical representations corresponding to statistical features of respective motifs for that MDL model and for dynamically updating the intelligent icons in response to changes in data associated with each respective intelligent icon, such that the intelligent icons represent only the most recent data values of the corresponding MDL model; and
means for displaying the intelligent icons so as to provide a visual indication of network security, wherein the displaying includes determining a relative importance of a corresponding motif within the MDL model associated with that motif and arranging the intelligent icons based on the relative importance of the corresponding motif within the MDL model associated with that motif.

11. The system of claim 10, wherein when the distance between the network activity data set and each of the mathematical models exceeds a predetermined threshold, the network activity data is identified as a new behavior and a mathematical modeling process is performed on the network activity data to generate a new mathematical model.

12. The system of claim 11, wherein the new mathematical model is classified as a normal mathematical model or an attack mathematical model.

13. The system of claim 12, wherein the new mathematical model is added to the mathematical model database.

14. The system of claim 10, wherein the means for detecting network intrusions includes means for partitioning the network activity data set according to the motifs of the MDL models in which each motif identifies a portion of the network activity data set corresponding to that motif.

15. A computer-implemented method of intrusion detection visualization comprising:
retrieving a plurality of minimum description length (MDL) models, each model representing a different network activity behavior;
receiving network activity data corresponding to network activity;
characterizing the network activity data using a computer programmed to perform intrusion detection visualization and the MDL models, the characterizing including generating, with the computer, a plurality of statistical features each representing a relationship between the network activity data and a respective one of the MDL models;
associating, with the computer, each of a plurality of intelligent icons with a corresponding one of the MDL models;
automatically altering, with the computer, an appearance of each intelligent icon based on at least one of said plurality of statistical features for said "in the phrase" automatically altering, with the computer, an appearance of each intelligent icon based on a statistical feature of the corresponding MDL model, and dynamically updating the intelligent icons in response to changes in data associated with each respective intelligent icon, such that the intelligent icons represent only the most recent data values of the corresponding MDL model;
displaying one or more of the intelligent icons on a display device coupled to the computer, the intelligent icons providing a visual indication of the statistical feature of the corresponding MDL model;
determining, with the computer, a relative importance of a corresponding motif within the MDL model associated with that motif; and
arranging the intelligent icons based on a relative importance of a corresponding motif within the MDL model associated with that motif.

16. The method of claim 15, further arranging the intelligent icons on the display device based on a similarity of the statistical feature of the corresponding MDL model.

17. The method of claim 15, wherein the characterizing includes calculating, with the computer, a proximity between the network activity data and the MDL models.

18. The method of claim 15, wherein the network activity is classified as normal activity or threat activity based on a result of the characterizing.

19. The method of claim 15, wherein the network activity is classified as a zero day attack when the network activity data is determined to have a distance from each of the MDL models that is above a predetermined threshold.

20. The method of claim 15, wherein the MDL models include a group of normal network activity models and a group of attack network activity models.

21. The method of claim 20, wherein each statistical feature of the relationship between the network activity data and a respective one of the MDL models, indicates whether the network activity data is more likely correlated with the group of normal network activity MDL models or with the group of attack network activity MDL models.

22. The method of claim 15, wherein the method further comprises partitioning the network activity data according to a corresponding motif of an MDL model in which each motif identifies a portion of the network activity data corresponding to that motif.

23. A network monitoring and visualization system comprising:
- a computer coupled to a network and adapted to receive data from the network, the computer including a computer readable medium having stored thereon software instructions for programming the computer to monitor the network and to provide a graphical visualization of monitored network activity, the software instructions, when executed by the computer, cause the computer to perform operations including:
- retrieving a plurality of minimum description length (MDL) models, each MDL model representing a different network activity behavior and each MDL model including a grammar having a plurality of motifs;
- receiving a network activity data sample corresponding to network activity;
- applying the grammar of each MDL model to the data sample to determine a measure of similarity between the data sample and the MDL model corresponding to the grammar being applied;
- partitioning the network activity data sample according to motifs of each MDL model in which each motif identifies a portion of the network activity data sample corresponding to that motif;
- characterizing the data sample based on the measure of similarity, including mapping a normalized difference value for each motif of grammar to a generate a plurality of statistical features;
- generating a plurality of intelligent icons, each corresponding to one of the MDL models and each including a plurality of graphical representations corresponding to one of the statistical features representing the normalized difference value of a respective one of the motifs for that MDL model; and
- simultaneously displaying the intelligent icons on a display device coupled to the computer,
- wherein the MDL models include a group of normal network activity models and a group of attack network activity models, and wherein intelligent icons corresponding to both groups are displayed simultaneously on the display device.

* * * * *